Dec. 1, 1931.  A. M. FARMER  1,834,449
COMPENSATING VALVE FOR LUBRICATING SYSTEMS
Filed Oct. 15, 1928

Inventor
Albert M. Farmer
By Swan Frye and Murray
Attorneys

Patented Dec. 1, 1931

1,834,449

UNITED STATES PATENT OFFICE

ALBERT M. FARMER, OF DETROIT, MICHIGAN, ASSIGNOR, BY MESNE ASSIGNMENTS, TO THE FARFALL COMPANY, OF DETROIT, MICHIGAN, A CORPORATION OF MICHIGAN

COMPENSATING VALVE FOR LUBRICATING SYSTEMS

Application filed October 15, 1928. Serial No. 312,578.

This invention relates to a compensating valve or controlling medium for insertion and connection as a link or unit of a multiple-nipple lubricating system, and has for its object an improved organization of parts, which, by acting more or less as a brake to the system as a whole, will allow the nipples controlling the delivery of lubricant to the individual bearings to operate at low pressure. If unprotected by this or an equivalent mechanism, the nipples appurtenant the several bearings, or similar parts to be lubricated, would be held from response to their spring-actuated tendency to close and remain closed by the presence of a continued pressure in the supply line. Similarly, the reverse or suction movement of the pump, in preparation for the next lubricant-projecting stroke, would create a vacuum tendency in the supply line which would withdraw at least a part of the projected lubricant from the system, thus necessitating a partial or entire refilling of the supply line by the next projective action of the pump before the supply of lubricant could again begin passing through the individual nipples into their respective bearings.

While no particular form of shell or casing is essential, except that it be provided with an inlet opening at one end and outlet opening at the other, in the preferred embodiment of my construction herein illustrated such a shell is composed of threadedly correlated parts A and B, provided with an inlet aperture C and an outlet aperture D respectively. Between the meeting edges of the parts A and B is interposed a spider or diaphragm member E preferably with washers F spacing either side of its peripheral edge from the enclosing shell edges, said spider or diaphragm being centrally apertured, as at G, for the engagement therethrough of the valve stem H, which carries in a suitable intermediate position along its length a collar or enlargement J, which cooperatively with the edges of the aperture in the spider E when in alignment with the plane thereof, serves to close communication between the space M within the shell which is appurtenant the inlet aperture C and the corresponding space N which is appurtenant the outlet aperture D.

Figure 6:
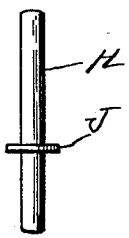
Figure 6 is an elevational view of the valve stem and of its aperture washer.
Figure 7:
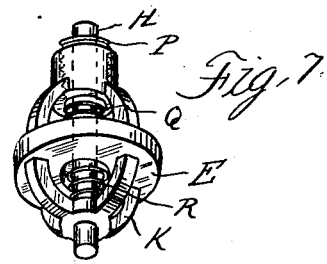
Figure 7 is a perspective of the internal parts of my device removed from the shell.
Figure 5:
Figure 5 is a detailed elevational view of the centrally bored adjusting screw.
Figure 4:
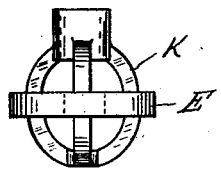
Figure 4 is an elevational view of the interior cage or framework and of the centrally perforated spider or diaphragm member.
Figure 3:
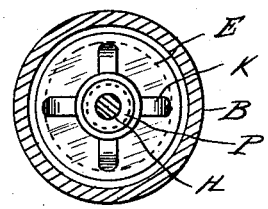
Figure 3 is a cross-sectional view taken along the line 3—3 of Figure 2 and looking in the direction of the arrows there shown.
Figure 1:
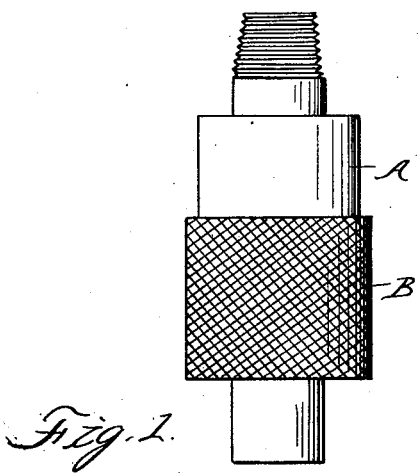
Figure 1 is an elevational view of my improved device.
Figure 2:
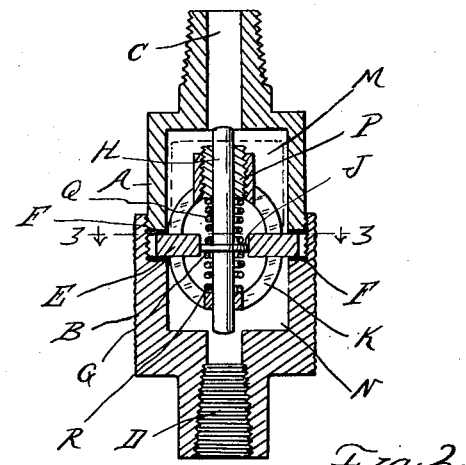
Figure 2 is a sectional elevational view.

Extending from either face of the spider E, and, if desired, forming single pieces which tightly engage therethrough, are a series of frame or skeleton pieces K of which four are illustrated in Figures 3 and 7, though any desired number may be employed, provided the space between them affords free access of a fluid toward and from the normally collar-closed central aperture G in the spider. These frame pieces thus constitute an overengaging dome structure which is apertured at the end of each sufficiently for the slidable engagement therethrough of the adjacent end of the valve stem H. Between each apertured dome portion of this frame or skeleton structure and an intermediate portion of the valve stem is positioned a helical spring, as Q and R, each connected at one end with the valve stem H and at the other end with the adjacent portion of the skeleton or frame in such a way that when they are balanced or put under strain to the degree required will leave the collar J in a position of closure with respect to the aperture G in the spider E. Both of these springs may if desired be fixed as regards adjustment after the parts have once been assembled, but I preferably show, as at P, a threaded nut which engages in a correspondingly threaded socket in one end of the skeleton or frame, by means of which the adjustment in the tension upon the spring Q and correspondingly upon the spring R may be varied so as to insure the positioning of the collar J in plane alignment with the spider E under varying conditions of liquid pressure.

With the parts as thus described adjusted for dealing with the pressure, of a lubricant or other fluid entering through the inlet port C, the spring R will act to resist axial lengthwise displacement of the valve stem H until the intendedly superior pressure of the entering lubricant, as it has accumulated within the chamber M is sufficient to push the valve stem H downwardly until the collar J no longer closes the communication between the chambers M and N, the lubricant or other fluid may then flow down into the lower chamber N and thence through the outlet port D. As soon, however, as the pressure is thus released and pressure through the inlet opening C is terminated by cessation of lubricant pressure from the supply source the spring reasserts itself against the pressure sufficiently to force the valve stem H upwardly until the collar J again effects a closure of the spider aperture G.

By providing a central aperture in the spider of sufficiently greater diameter than the valve stem so that slight waverings or irregularities from its true and intended lengthwise movement will not effect a binding between its lateral surface and that of the surrounding edges of the aperture G, and then compensating for this by providing the collar J for effecting a closure of the aperture G when positioned in the same plane therewith I am thus enabled to insure free movement of the valve stem H whenever pressure conditions call therefor, though effectively closing the aperture G when pressure conditions are terminated or balanced.

The strength and adjustment of the spring Q is also such that upon the return stroke of the lubricant-projecting pump or other member which feeds the system protected by my device, the lubricant already within the distributive portion of the system, that is in the supply lines between this device and the individual feed nipples appurtenant the several bearings, is protected against a vacuum influence which if not curbed would draw back some of the already projected lubricant from the nipples, thus making it necessary for the pump to effect an at-least partial refilling of the supply line before the nipples could resume their measured feed to the bearings. The presence of the collar J in closure position with respect to the aperture G in the spider prevents this, thus leaving the supply system full but under no further pressure until the next projective action of the pump.

What I claim is:

1. In a compensating valve, in combination with a plurally pieced shell provided with aligned terminal inlet and outlet apertures, a centrally apertured partition member positioned across the intermediate portion of said shell and partially held in position by the engagement of the ends thereof against its peripheral edge, a framework connected to said partition and extending on either side thereof, a valve stem journaled therein and movable lengthwise thereof and of said shell, and through the aperture in said partition member, being provided with an aperture-regulating collar near its center, springs operatively engaging said valve stem on either side of said collar but within said framework, whereby it is yieldingly maintained in position of closure with respect to the aperture in said partition member, means for removing from said shell at will the entire framework, and an adjusting nut also carried by the framework appurtenant one of said springs whereby adjustment of its relative tension may be effected to maintain the desired position of said valve stem collar relatively to the plane of said apertured partition member when the device is at rest.

2. In combination with a plurally sectioned shell member provided with terminal apertures, a transversely positioned and centrally apertured partition member intermediate its ends, its peripheral edge being held between the shoulders of the sections of said shell, a framework within said shell carried by said partition member on both sides thereof, a valve stem supported by, and movable relatively to said framework, its effective portion operatively engaging through the aperture in said partition member, a collar positioned centrally of said valve stem in position to cooperate with the edges of said partition member which surrounds its central aperture in regulating or shutting off communication between the two chambers within the shell which are separated by said partition, spring members operatively engaging said framework and the ends of said valve stem on either side of said partition member, for yieldingly holding said valve stem collar in position of closure with respect to the aperture in said partition member, and means operatively appurtenant one of said springs whereby variations in the action of the springs upon their respective ends of the valve stem may be equalized, said associated partition, framework, valve and spring members being thereby unitarily removable from the shell at will by releasing the engagement of the interfitting shell portions about said partition.

3. The combination with a shell formed of threadedly connected members provided with axially aligned inlet and outlet apertures, of an intermediate partition member provided with a centrally located aperture, which may be clamped between said threadedly interfitting members, a framework carried by and extending on either side of said partition within said shell, a valve stem provided with an enlarged portion intermediate its ends movably supported by said framework and adapted to close the aperture in said partition member when located in position of substantial coincidence with the plane thereof, springs also supported within said framework for yieldingly holding said valve stem in such described position, and means for varying the tension of one of the springs to effect the maintenance of the described position of said valve stem enlargement when the device is at rest, said valve and associated parts being unitarily removable at will with said framework from the shell.

4. In combination with a threadedly correlated and terminally apertured hollowed shell provided with a centrally apertured partition removably positioned transversely within the central portion thereof, an open framework connected to and carried by the partition on either side thereof within said shell, a valve stem provided with an aperture-closing collar supported by, and movable relatively to said framework lengthwise of said shell and through the aperture in said partition, spring members operatively engaging those portions of said valve stem on either side of said partition and retained by the respectively adjacent portions of said framework, and means operatively appurtenant one of said spring members whereby the draw of said springs upon said valve stem may be so adjusted as to maintain said collar in normal position of coincidence with the plane of said partition, said framework, with the valve springs and associated parts being unitarily removable at will from said shell.

5. The combination with a hollowed shell member composed of a plurality of operatively correlated elements of an apertured partition member removably positioned therein intermediately of said apertures with its peripheral edge positioned between the adjacent edges of said shell elements, overengaging guide members supported by and on either side of said partition member, a valve stem movably engaging through said apertured partition member and said guide members, being supported by the latter, a collar located intermediately of the ends of said valve stem in normal position of closure with respect to the aperture in said partition, and spring members supported, retained by, and operatively connecting their respective portions of said overengaging guide members and the adjacent portions of said valve stem, whereby the collar carried by the latter is yieldingly held in the described position of closure with respect to the aperture in the partition member, and whereby said partition, guide members, valve, springs, and associated interior parts may be removed as a unit from said shell.

In testimony whereof I sign this specification.

ALBERT M. FARMER.